United States Patent
Saunders et al.

(10) Patent No.: US 9,129,257 B2
(45) Date of Patent: Sep. 8, 2015

(54) METHOD AND SYSTEM FOR MONITORING HIGH RISK USERS

(75) Inventors: Donald E. Saunders, Carrollton, TX (US); Jeremy D. Newhouse, Irving, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 790 days.

(21) Appl. No.: 12/972,727

(22) Filed: Dec. 20, 2010

(65) Prior Publication Data
US 2012/0158454 A1 Jun. 21, 2012

(51) Int. Cl.
G06F 21/00 (2013.01)
G06Q 10/10 (2012.01)
G06Q 10/06 (2012.01)
G06F 21/50 (2013.01)
G06F 21/60 (2013.01)

(52) U.S. Cl.
CPC ............... G06Q 10/10 (2013.01); G06F 21/00 (2013.01); G06Q 10/0635 (2013.01); G06F 21/50 (2013.01); G06F 21/60 (2013.01)

(58) Field of Classification Search
CPC ......... G06F 21/00; G06F 21/50; G06F 21/60; G06Q 10/10; G06Q 10/0635
See application file for complete search history.

(56) References Cited

U.S. PATENT DOCUMENTS

| | | | |
|---|---|---|---|
| 7,461,402 B1* | 12/2008 | Lyle et al. | 726/22 |
| 8,776,168 B1* | 7/2014 | Gibson et al. | 726/1 |
| 2002/0157021 A1* | 10/2002 | Sorkin et al. | 713/201 |
| 2006/0020814 A1* | 1/2006 | Lieblich et al. | 713/182 |
| 2007/0273480 A1* | 11/2007 | Burkman et al. | 340/7.52 |
| 2010/0043055 A1* | 2/2010 | Baumgart | 726/2 |
| 2010/0125911 A1* | 5/2010 | Bhaskaran | 726/23 |
| 2011/0296526 A1* | 12/2011 | Kim et al. | 726/24 |
| 2012/0042364 A1* | 2/2012 | Hebert | 726/6 |

OTHER PUBLICATIONS

"Processor." Defininition of processor by the free online dictionary.*

* cited by examiner

Primary Examiner — Michael S McNally
Assistant Examiner — Kendall Dolly

(57) ABSTRACT

An approach for enabling the monitoring of high risk users is described. A high risk user (HRU) event management platform designates a user as a high risk user candidate and then initiates monitoring of activities of a computing device associated with identity information of the user. The HRU event management platform then collects data from the computing device and from one or more data sources according to one or more predetermined parameters specifying asset information. The data is correlated with the identity information of the user for confirming that the user is a high risk user.

18 Claims, 8 Drawing Sheets

METHOD AND SYSTEM FOR MONITORING HIGH RISK USERS

BACKGROUND INFORMATION

Challenging economic conditions combined with drastic changes in the workforce demographic are increasing the occurrence of malicious activity, particularly by disgruntled insiders. A malicious insider is a current or former employee, contractor or business partner who has or had authorized access to an organization's network, systems, data and other resources. Typically, the insider's behavior is considered malicious or high risk, because they intentionally exceeded or misused their access privileges in a manner that negatively affected the confidentiality, integrity or availability of the organization's information or information systems. Unfortunately, the ability of an organization to perform comprehensive monitoring of high risk user activity is limited, as traditional systems are primarily aimed at outside intrusions.

Based on the foregoing, there is a need for an effective approach to monitoring high risk users.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for enabling monitoring (e.g., cyber monitoring) of high risk users is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
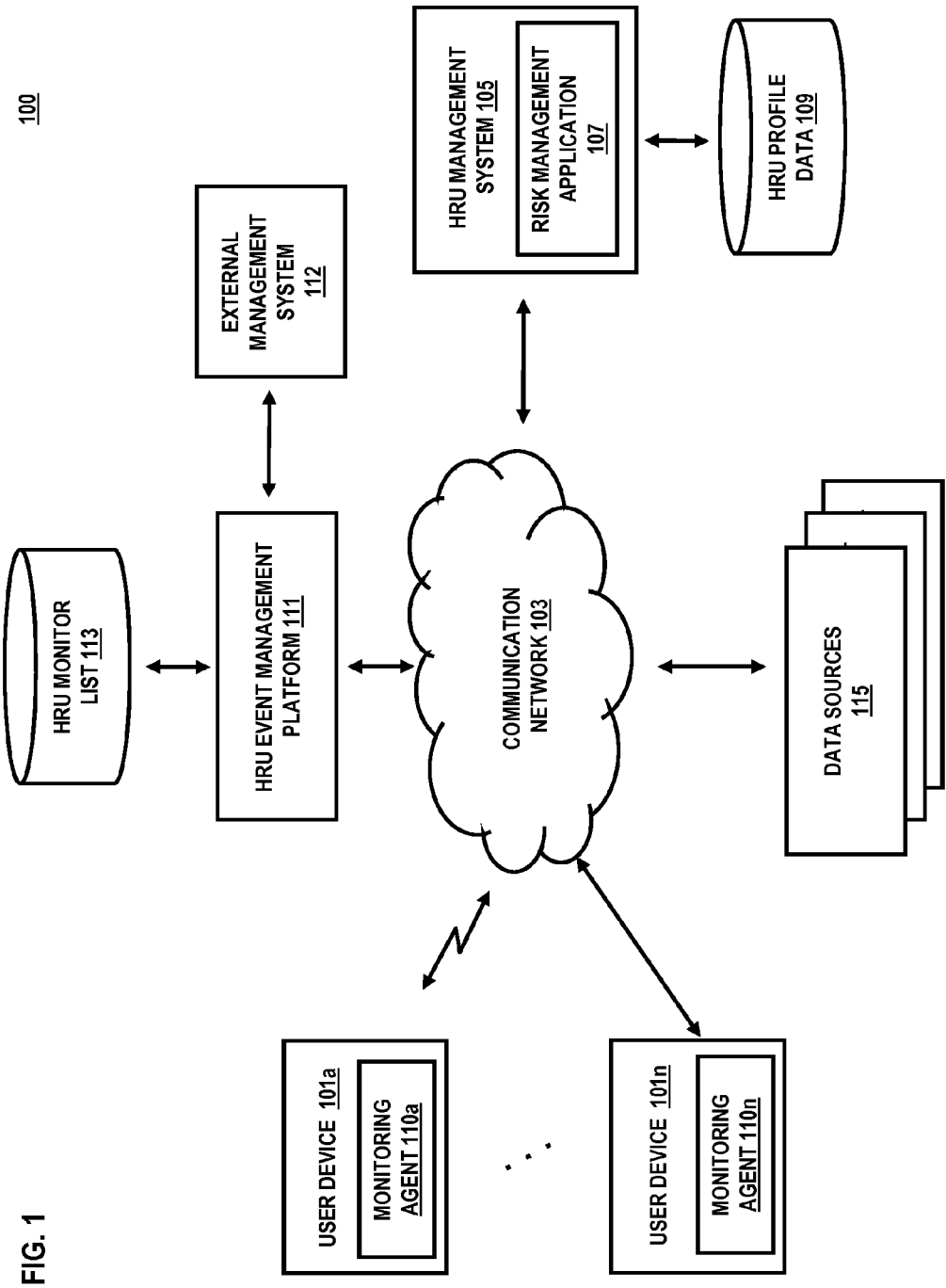
FIG. 1 is a diagram of a system for enabling monitoring of high risk users, according to one embodiment.

FIG. 1 is a diagram of a system for enabling monitoring of high risk users, according to one embodiment. For the purposes of illustration, system 100 includes one or more user devices 101a-101n (which may include any type of computing device) with wired or wireless connectivity to a communication network 103 that is managed by an enterprise, business, or organization. By way of example communication network 103 may be a local area network (LAN), a metropolitan area network (MAN), or a wide area network (WAN). In addition, or in the alternative, communication network 103 can include systems and networking resources of a service provider—i.e., the enterprise is a subscriber of telecommunication services of the service provider. In this example, system 100 is configured to provide a user or agent authorized by the organization to act as a "monitor," such as a network administrator, human resources specialist, security staff member, legal staff member or other party, with the appropriate permissions and capabilities for monitoring organizational assets and characterizing high risk activity. In certain embodiments, "high risk activity" pertains to any damaging, threatening and/or malicious behavior or actions undertaken by a person or entity having internal or direct access to a communication network 103 associated with an organization (e.g., intranet, WAN, LAN, enterprise network, network operating system), resources capable of being configured to the communication network 103, or a combination thereof. By way of example, the user has an employee-employer relationship with the organization. The risk capable of being incurred by the organization is deemed high due to the negative affects the behavior and/or action may pose to the intended or current operation, function, perception or purposeful engagement of the organization with its affiliates, customers, partners and associates. In certain embodiments, a person or entity deemed by the organization as having engaged in or having the potential to engage in high risk activity is therefore considered a "high risk user" (HRU).

As mentioned, typically, the HRU may include current or former employees, contractors or business partners who had or have authorized access to an organization's communication network 103, data, systems and other resources belonging to the organization. In certain embodiments, "resources" may include databases, computing devices and server systems, wireless communication devices such as smartphones and personal data assistants (PDAs), customer relationship management systems, software tools, printing devices and other assets that may be internally or externally accessible to the HRU. In addition, "resources" may also include information maintained by the organization, for external and internal use, such as documents, graphics, audio and video media, data files and other data. The individuals deemed high risk may include those identified for workforce reductions, individuals with access to specific sensitive information, or individuals who have been repeat offenders and are on probation. Often, as former or current associates or members of the organization, HRUs are quite familiar with internal policies, procedures and technology of the organization and can exploit that knowledge to carry out malicious/high risk activity or collude with external attackers.

High risk activities may include any behavior or actions where the HRU intentionally exceeds or misuses their access privileges to the organizations communication network 103, various devices configured thereto, data sources configured thereto and other resources in a manner that adversely impacts the confidentiality, integrity or availability of the organization's information or information systems. There are many vectors and tools that can be used to support the malicious actions of a HRU (e.g., disgruntled employee, fired contractor, etc.). The devices may include: portable or external memory devices such as universal serial bus (USB) devices, hard-drives, thumb drives, and phones, etc.; removable media devices such as media cards and writable disks (e.g., CD-RW, DVD-RW); encryption in the form of secure digital communication with outsiders; unauthorized wireless connections, links and data feeds; web-mail, file sharing sites and peer-to-peer traffic; uploading of malicious code to internal server(s) and/or communication network 103 configured devices; working from remote locations over a virtual private network (VPN) and the like. It is noted that the above described vectors and tools may be utilized for impacting various resources of the organization, including data and media, computing devices, servers, software applications, operating systems, wireless communication devices, network components, databases, etc.

Unfortunately, many enterprise or organizational based security devices and or systems do not make a distinction between authorized access and malicious activity. Monitoring activity surrounding a single isolated data source is not enough to determine user intent or provide a holistic overview of user activity—i.e., the isolated data may only be presenting a limited view of the potential malicious activity. Many security systems use different identities or no identities at all that can be associated with the same user. Hence, there is no effective way to perform user based monitoring of disparate data sources or correlate the data sources together to gain a comprehensive perspective of user activity.

To address this issue, system 100 includes a HRU management system 105 for enabling a person to monitor and track high risk user (HRU) activity and engagement with organizational resources. In certain embodiments, "organizational resources" or "assets" may include computing devices and workstations, data sources including databases and externally memory devices, web based services and network systems. Still further, organizational resources and assets may also include third-party applications, services and/or devices employed by the organization for use by members of the organization. By way of example, the HRU management system 105 may connect to and communicate with these resources via a communication network 103 that supports internal and remote communication with various assets. The HRU management system 105 identifies and monitors the asset type/classification, identity of the asset, login information pertaining to the asset and internet protocol (IP) information (e.g., network address and location). In one embodiment, system 105 is managed by the enterprise or organization; however, alternatively, the management system 105 can be offered as a managed service by a service provider.

Depending on the requirements and complexities of the organization for which the HRU management system 105 is used, it may be employed as a standalone asset monitoring and verification solution. Alternatively, the HRU management system 105 may be integrated with existing network security and administration systems. Under the latter scenario, the HRU management system 105 may account for established network policies, access protocols, data loss prevention techniques, server allocation schemes and the like. Still further, the HRU management system 105 may interface with existing human resource information systems (HRIS), enterprise resource planning (ERP) systems and other organizational management tools for enabling data sharing and exchange.

A risk management application 107 may also be operable in connection with the HRU management system 105. In certain embodiments, the risk management application 107 is a software application or front end web application/service for enabling a monitor to initially define one or more users as HRU candidates. Candidates may include any person/user having access to user devices 101a-101n and/or that are associated with the various data sources 115 of the organization. By way of example, the risk management application 107 enables creation of HRU profile data 109 for specifying one or more parameters associated with such persons, including a name of the HRU candidate (e.g., first, middle, last), an associated identifier for the candidate (e.g., employee ID, user ID), a monitoring time frame including a start and end date, a monitoring status for flagging or unflagging the user as a candidate, a date of insertion of the HRU profile data 109, etc. Additional information pertaining to a specified HRU candidate and the assets or resources for which they are associated may be imported from other data sources 115 such as a HRIS or network administration system and subsequently added as profile data 109 by the risk management application 107.

It is noted that the risk management application 107 enables the monitor to define candidates as well as validate their high risk status according to one or more predetermined parameters (e.g., activity and/or event conditions being met). As will be discussed in greater detail with respect to FIG. 2, the HRU event management platform 111 operates in connection with the HRU management system 105 to alert a monitor of a determined correlation between a HRU candidate and detected high risk activity.

In certain embodiments, high risk user activity and/or event information is provided to the HRU event management platform 111 by way of one or more monitoring agents 110a-110n. The agents 110a-110n are configured for operation upon the one or more user devices 101a-101n of the HRU candidates. By way of example, the agents monitor activity information pertaining to the use of the asset 101 by a user, including a hostname of the user for matching them against the watch list maintained by the HRU event management platform 111. The watch list may be generated by the HRU event management platform 111, in one embodiment. Alternatively or additionally, the watch list can be obtained from an external management system 112 (e.g., a management system maintained by a different entity than the entity associated with platform 111). The external management 112 may have similar functional capabilities as system 105, such as identifying assets, etc. In addition, the monitoring agents 110a-110n identify event time of occurrence information, event occurrence description data (e.g., file deletion activity, USB device write activity), action status information and other data.

In addition, the HRU event management platform 111 may be configured to receive activity and/or event data from the various data sources 115 available to the organization such as by way of the communication network 103. For example, the activity and/or event data is extracted from one or more organizational, content inspection or enterprise systems, such as those for monitoring network activity, user desktops, web servers or critical business servers, human resource and personnel, logistics, etc. Data sources 115 of this nature may be maintained by the organization as part of the overall infrastructure of the communication network 103, and particularly, for inspecting and logging certain events. In other instances, the data sources 115 may be made available to the organization by way of the communication network 103 as third party or hosted solutions, i.e., data feeds, web services, internet/network solutions, etc.

Alternatively, monitoring agents 110a-110n may be configured for operation with the data sources 115 for gathering and logging information pertaining to various activities and events. The type of data source 115 and corresponding data retrieved may stem the following sources: user workstation, content inspection systems, Proxy/Firewall/Domain Name Server (DNS), and/or Virtual Private Network (VPN). User workstation (e.g., laptop, desktop) security related information may involve logs from end point security systems that run on workstations to monitor for security conditions such as data loss. Additionally, content inspection systems related information can be derived from logs of network based security systems available to the HRU candidate that monitor for specific content conditions such as proprietary company data.

Proxy/Firewall/Domain Name Server (DNS) related information can involve logs from internal web access systems available to the HRU candidate that have records of all traffic to the internet. Lastly, VPN related information can be obtained from logs of VPN systems that have records of all traffic coming into the network, and the like.

It is noted that the type of information logged and maintained by the monitoring agents 110a-110n operable on a workstation, provided by data sources 115 (e.g., via extract, transform and load (ETL) processing), or combination thereof, may vary by the type of organizational asset being monitored. Furthermore, information logged and maintained by the monitoring agents 110a-110n or as provided by the data sources 115 is normalized and sent to the HRU event management platform 111 over the communication network 103.

Also, it is noted that user devices 101a-101n available for use by a given HRU candidate may be any type of mobile terminal, fixed terminal, or portable terminal including a mobile handset, station, unit, device, multimedia computer, multimedia tablet, Internet node, communicator, desktop computer, laptop computer, terminal server, Personal Digital Assistants (PDAs), smartphone or any combination thereof. It is also contemplated that user devices 101a-101n can support any type of interface for accessing organizational assets and resources via a communication network 103, including remote access. In general, user devices 101a-101n may feature a browser or portal application for enabling network communication and access to an intranet system, databases and network drives containing proprietary information, etc. Any known and future implementations of user devices 101 are applicable.

As described, in various embodiments, network 103 may be any suitable wireline and/or wireless network (or internetwork of such networks), and may be managed by one or more service providers. Also, the network 103 can interface with a variety of other networks and systems, including, for example, a Public Switched Telephone Network (PSTN). In the case of a wireless network configuration, network 103 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (Wi-Fi), satellite, and the like. In addition, network 103 may embody or include portions of a signaling system 7 (SS7) network, or other suitable infrastructure to support control and signaling functions.

By way of example, organizational assets in the form of user devices 101a-101n may be any type of mobile terminal, fixed terminal, or portable terminal including a mobile handset, station, unit, device, multimedia computer, multimedia tablet, Internet node, communicator, desktop computer, laptop computer, workstation, terminal server, Personal Digital Assistants (PDAs), smartphone or any combination thereof. It is also contemplated that user devices 101a-101n can support any type of interface for accessing various internal and/or external data sources 115 of the organization via communication network 103, including by way of remote access. In general, user devices 101a-101n may feature a browser or portal application for enabling network communication and access to an intranet, network drives containing proprietary information, etc. Any known and future implementations of user devices 101 are applicable.

Figure 2:
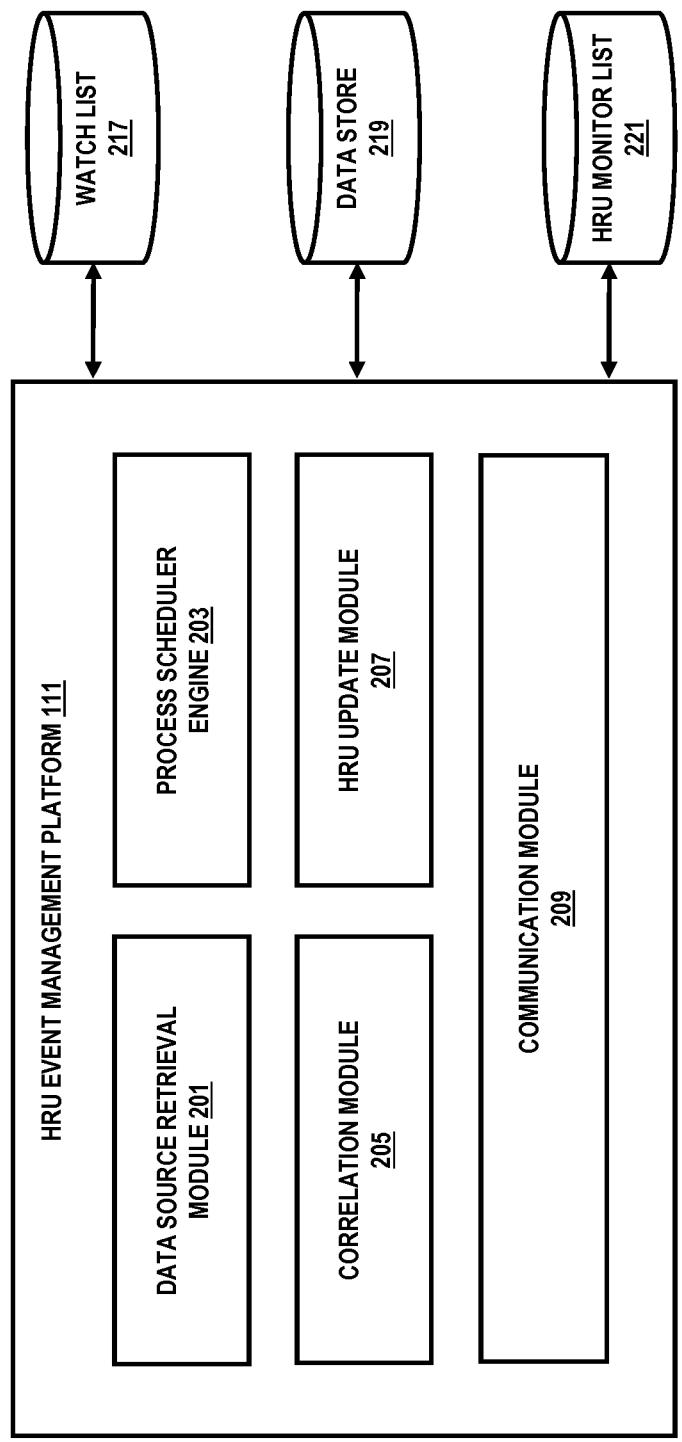
FIG. 2 is a diagram of a high risk user event management platform utilized in the system of FIG. 1, according to one embodiment.

FIG. 2 is a diagram of a high risk user (HRU) event management platform for enabling monitoring of high risk users, according to one embodiment. The HRU event management platform 111 includes various executable modules for performing one or more computing, data processing and network based instructions that in combination provide a means of detecting and alerting a monitor of undesirable user activity. Such modules can be implemented in hardware, firmware, software, or a combination thereof. By way of example, the HRU event management platform 111 may include a data source retrieval module 201, process scheduler module 203, correlation module 205, HRU update module 207 and communication module 209.

It is noted that the HRU event management platform 111 may also maintain a watch list 217 that indicates which users have been deemed as high risk user candidates by a monitor via the risk management application 107. The HRU event management platform 111 may also designate a user as a high risk candidate based on a validation process performed with respect to entries in the list 217. Still further, the risk status of a candidate may be updated and maintained within a HRU monitor list 221 responsive to a determined correlation between the candidate and monitored high risk user activity. Hence, the watch list 217 may be adapted by the monitor from the risk management application 107 for identifying risks, while the HRU monitor list 221 is maintained by the HRU event management platform 111 for enterprise level management and monitoring of HRUs.

In one embodiment, a communication module 209 enables formation of a session over a network 103 between the HRU event management platform 111, the monitoring agents 110a-110n and the HRU management system 105. By way of example, the communication module 209 enables various protocols and data sharing techniques for enabling collaborative execution between a computing device, such as user devices 101a-101n as well as HRU management system 105 and the HRU event management platform 111 over the communication network 103. It is noted that the communication module 209 may also operate in connection with the risk management application 107, via the HRU update module 207, for enabling updating of HRU data to the graphical user interface (GUI) upon request.

In one embodiment, the data source retrieval module 201 accesses activity and event information regarding the various deployed resources (e.g., user devices 101a-101n and data sources 115) of the organization, and hence, a given HRU candidate. As mentioned previously, HRU candidates are those users placed on a watch list 217 by the monitor (e.g., HR personnel, security team member) through use of the risk management application 107. The data source retrieval module 201 receives the user activity information and event data logged and transmitted by the various monitoring agents 110 operating on a user device 101. In addition, the data source retrieval module 201 may receive information from one or more data sources 115 associated with the organization, including data pertaining to security conditions such as data loss statistics or event information, details regarding specific content conditions such as proprietary company data access, update or retrieval status, network traffic and site visitation information, data pertaining to incoming traffic transmitted over a virtual private network connection, software upload activity, open communication links, etc. It is noted that the data source retrieval module 201 receives the above described activity and event information/parameters are then maintained in a data store 219 for access by a correlation module 205.

Of note, the data source retrieval module 201 accesses data based on one or more parameters that are useful for identifying activity or events pertaining to a specific user. As mentioned previously, the parameters may include asset information such as a hostname or MAC address of a workstation (e.g., laptop), login information such as login event times, IP address information, user e-mail addresses, etc. All of the parameters may be linked to a specific employee identifier value. By way of example, the data source retrieval module 201 references the watch list 217 to extract pairs of data, i.e., parameters as related to the employee identifier value associated with the HRU candidate in question. For this approach, the data source retrieval module 201 extracts data by way of the monitoring agents or the various data sources as follows:

- Perform an ID Extract for acquiring a data pair that contains the Employee ID and Identities (UserID, Email Address)
- Perform a Hostname Extract for acquiring a data pair that contains the Employee ID and Hostname.
- Perform an IP Extract for acquiring a data pair that contains the Employee ID and IP Address.

Tables 1-3 below present examples of data extracted as a result of the above described processes, which are presented for the purpose of illustration. It is noted, however, that the data source retrieval module 201 may be configured to export pairs of data consisting of the employee ID plus any other value.

TABLE 1

Example ID Extract

| Employee ID | UserID |
|---|---|
| 0123456789 | jsmith |

TABLE 2

Example Hostname Extract

| Employee ID | Hostname |
|---|---|
| 0123456789 | jsmith-desktop |

TABLE 3

Example IP Address Extract

| Employee ID | IP Address |
|---|---|
| 0123456789 | 1.2.3.4 |

In certain embodiments, the correlation module 205 operates in connection with the data source retrieval module 201 to correlate the retrieved activity and/or event information 219 with a high risk user candidate specified on the watch list 217. By way of example, the correlation module 205 uses a unique data field (e.g., employee ID) as a key parameter to correlate gathered activity and/or event data with a particular HRU candidate. Under this scenario, the correlation module 205 uses the watch list 217 as a means of cross referencing monitored (base) events and/or activities with specified high risk events and/or activities, thus generating a correlation. It is noted therefore, that not every action engaged by a HRU candidate will result in a correlation, but rather, only those correlated with high risk activity. For example, information that pertains to use of a universal serial bus (USB) storage device in connection with a candidate's accessing of sensitive documents, may be correlated as potentially high risk activity.

When correlation between the engaged activity of a HRU candidate and predetermined parameters for indicating high risk activity is made, the HRU candidate may be flagged as high risk by a HRU update module 207. In certain embodiments, the HRU update module 207 escalates the user from a candidate, where the specified HRU status on the watch list 217 is set to "FALSE," to an actual HRU, where the specified HRU status on a HRU monitor list 221 is set to "TRUE" in response to a determined correlation. An example HRU monitor list 221 entry/data record associated with a user "John Q. Smith," is shown below (Table 4):

TABLE 4

| Field | Value |
|---|---|
| User Name | John Q. Smith |
| Employee ID | 0123456789 |
| Start Date | Jan. 1, 2000 |
| End Date | Jan. 31, 2000 |
| Insert Date | Dec. 31, 1999 |
| Status | True |
| UserID | jsmith |
| Email | john.smith@domain.com |
| Hostname | jsmith-desktop |
| MAC Address | AA:BB:CC:DD:EE:FF |
| IP Address | 1.2.3.4 |
| Lease Time | Dec. 13, 1999 |
| Login Time | Dec. 31, 1999 |

Of note with respect to the above example, the HRU status in the HRU monitor list 221 is set by the HRU update module 207 to "TRUE," indicating that John Q. Smith is no longer a candidate but a verified risk to the organization. As a result, the HRU update module 207 generates a signal for alerting the appropriate members of the organization, e.g., HR personnel, legal department, etc. via the HRU management system 105. By way of example, the risk management application 107 may generate a prompt indicating the status change—i.e., HRU status adapted from "FALSE" to "TRUE"—via a graphical user interface (GUI)

In addition to updating the HRU monitor list 221, the HRU update module 207 performs a process for validating that a HRU candidate being added to a watch list 217 at the risk management application 107 is able to be monitored. The validation process is a control measure employed by the HRU event management platform 111 (via the HRU update module 207) to insure that adequate information is available for the specified candidate. By way of example, the HRU update module 207 performs a query against the available data sources 115 for information on the user. This may include a look up and/or confirm of the Hostname and MAC address associated with the specified user, look up and/or confirm of the IP Address associated with the user by MAC Address and look up of the login time associated with the user by UserID. In certain instances, the HRU update module 207 may determine, based on the gathered event and/or activity data 219, that no other IP address lease data or login time information for the same asset as associated with the candidate has occurred by other users.

Results or feedback from the validation process, including whether or not enough information is available for enabling user monitoring, may be provided to the GUI of the risk management application 107 by the HRU update module 207 accordingly. Alternatively, the module 207 may report results via email, short messaging service (SMS) or other communication means. Still further, the HRU management system 105 can filter events and/or activity information based on HRU correlations.

In one embodiment, the process scheduler engine 203 automates the processes performed by the data source retrieval module 201, correlation module 205 and HRU update module 207. Also, the process scheduler engine 203 automatically retrieves updated watch list 217 data according to a predetermined schedule. Depending on organizational or monitor preferences, the process scheduler 203 may be set to run every twenty-four hours, weekly, or some other frequency to determine if an entry on the watch list 217 should be enabled or disabled as a result of an updated status column. By way of example, if the current date of the user performed activity and/or event is between a selected monitoring start date and monitoring end date, then the status as set by the HRU update module 207 is enabled to affect the status of the HRU monitor list 221. If the current date is outside the start date and end date, however, the high risk user status is disabled in the list 221.

It is noted that the scheduling frequency of the process scheduler engine 203 may be adapted to support various monitoring schemes, including off peak hours monitoring. Under this scenario, if a HRU candidate performs a high risk activity prior to normal business hours, a scheduled morning HRU monitor list update, activity and/or event correlation and HRU status update process may be performed to enable the monitor to be aware of the change, assuming the occurrence lies within the start and end date. Also of note, the process scheduler engine 203 generates control signals for enabling or disabling operation of the data source retrieval module 201, correlation module 205 and HRU update module 207 according to the schedule.

Figure 3B:
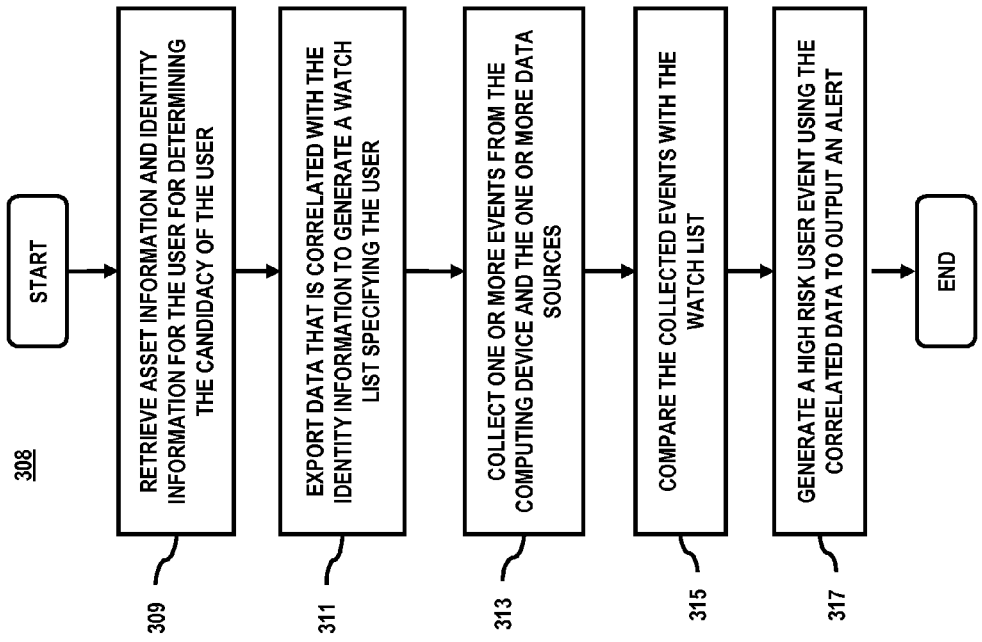
FIGS. 3A-3C are flowcharts of a process for enabling monitoring of high risk users, according to various embodiments.
Figure 3A:
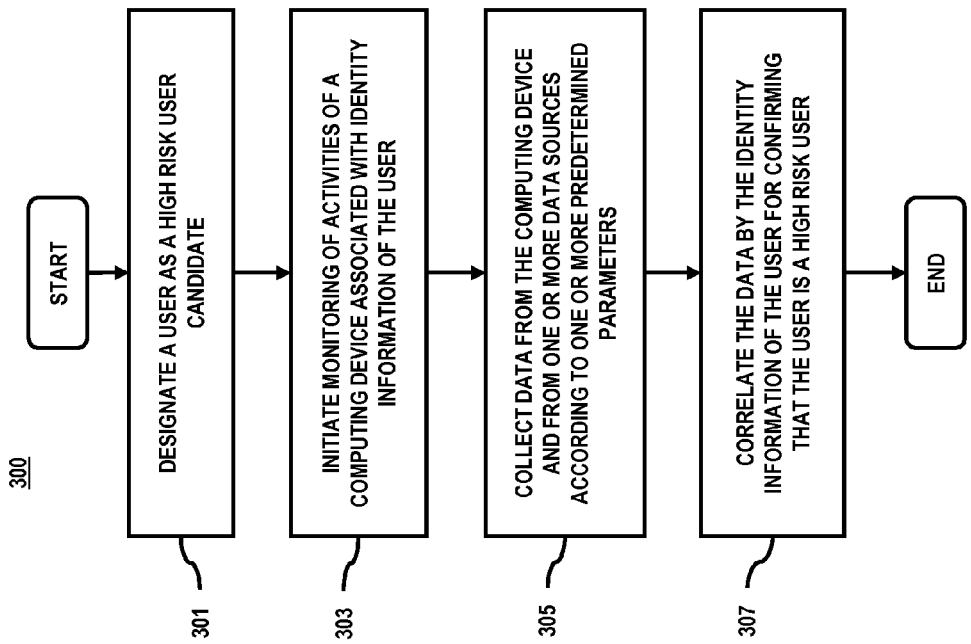
Figure 3C:
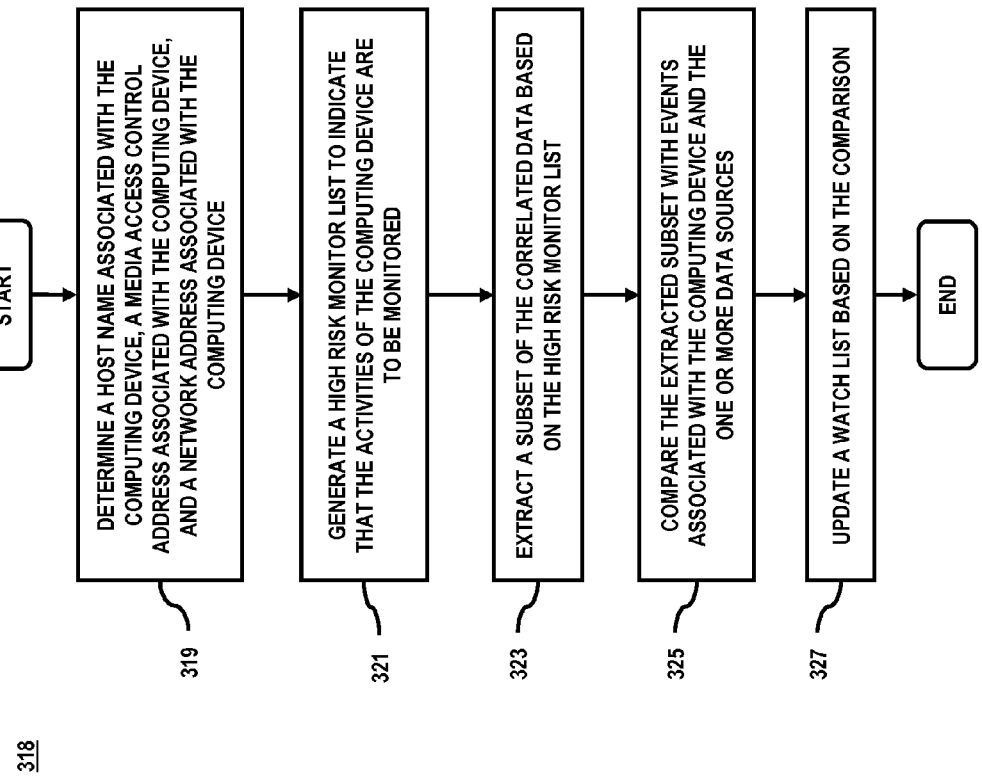

FIGS. 3A-3C are flowcharts of processes for enabling monitoring of high risk users, according to various embodiments. For the purpose of illustration, the processes are described with respect to FIG. 1. It is noted that the steps of the process may be performed in any suitable order, as well as combined or separated in any suitable manner. As seen in FIG. 3A, in step 301 of process 300, the HRU event management platform 111 designates a user as a high risk user candidate. As mentioned previously, this includes validating a high risk user candidate as entered to a watch list. In step 303, the HRU event management platform 111 initiates monitoring of activities of a computing device associated with identity information of the user. In another step 305, data from the computing device and from the one or more data sources according to one or more predetermined parameters is collected by the HRU event management platform 111. As mentioned, the one or more predetermined parameters may include an employee ID, UserID, MAC address, IP address, etc. In step 307, the HRU event management platform 111 correlates the data by the identity information of the user for confirming that the user is a high risk user. It is noted that the user's status is updated from FALSE to TRUE to initiate the alert and monitoring process for that user.

In step 309 of process 308 (shown in FIG. 3B), the HRU event management platform 111 retrieves asset information and identity information for the user for determining the candidacy of the user. In step 311, the HRU event management platform 111 exports data that is correlated with the identity information to generate a watch list specifying the user. As mentioned, the data may be provided by one or more data sources 115 and/or monitoring agents 110a-110n operating in connection with the assets of the organization.

In steps 313 and 315, the HRU event management platform 111 collects one or more events from the computing device and the one more data sources and compares the collected events with watch list. In step 317, based on the comparison, the HRU event management platform 111 generates a high risk user event using the correlated data to output an alert. By way of example, alerts may be executed via email, SMS or via an interface of the risk management application 107.

In step 319 of process 318 (of FIG. 3C), the HRU event management platform 111 determines various parameters associated with the user on the watch list, including a host name associated with computing device, a media access control address associated with the computing device, and a network address associated with the computing device. In step 321, the HRU event management platform 111 generates a high risk monitor list 113 to indicate that the activities of the computing device are to be monitored. As mentioned, the high risk monitor list 113 includes data regarding user including the identity information, the host name, the media access control address and the network address. As noted, alternatively, this watch list can be supplied or retrieved for an external management system. In another step 323, the HRU event management platform 111 extracts a subset of correlated data based on the information maintained on the high risk monitor list, the correlated data being determined pursuant to monitored user activity.

In step 325 of the process, the HRU event management platform 111 compares the extracted subset with events associated with the computing device and the one or more data sources 115. As mentioned previously, this comparison process entails determining whether the monitored events are associated with those activities deemed to be high risk for the particular user in question. In another step 327, the HRU event management platform 111 updates the watch list based on the comparison.

Figure 4A:
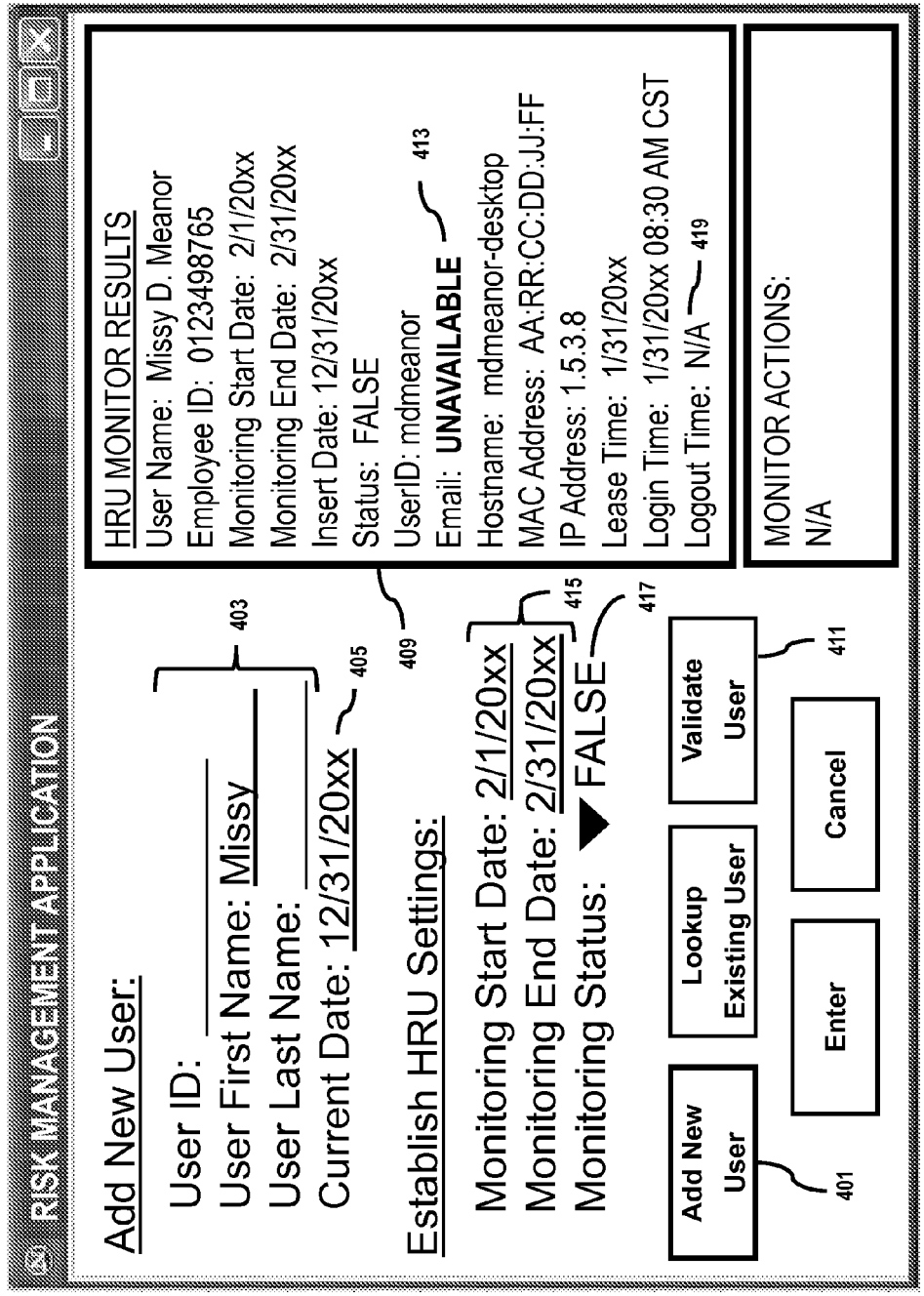
FIGS. 4A and 4B are diagrams of a user interface of a risk management application for managing high risk users, according to various embodiments.
Figure 4B:
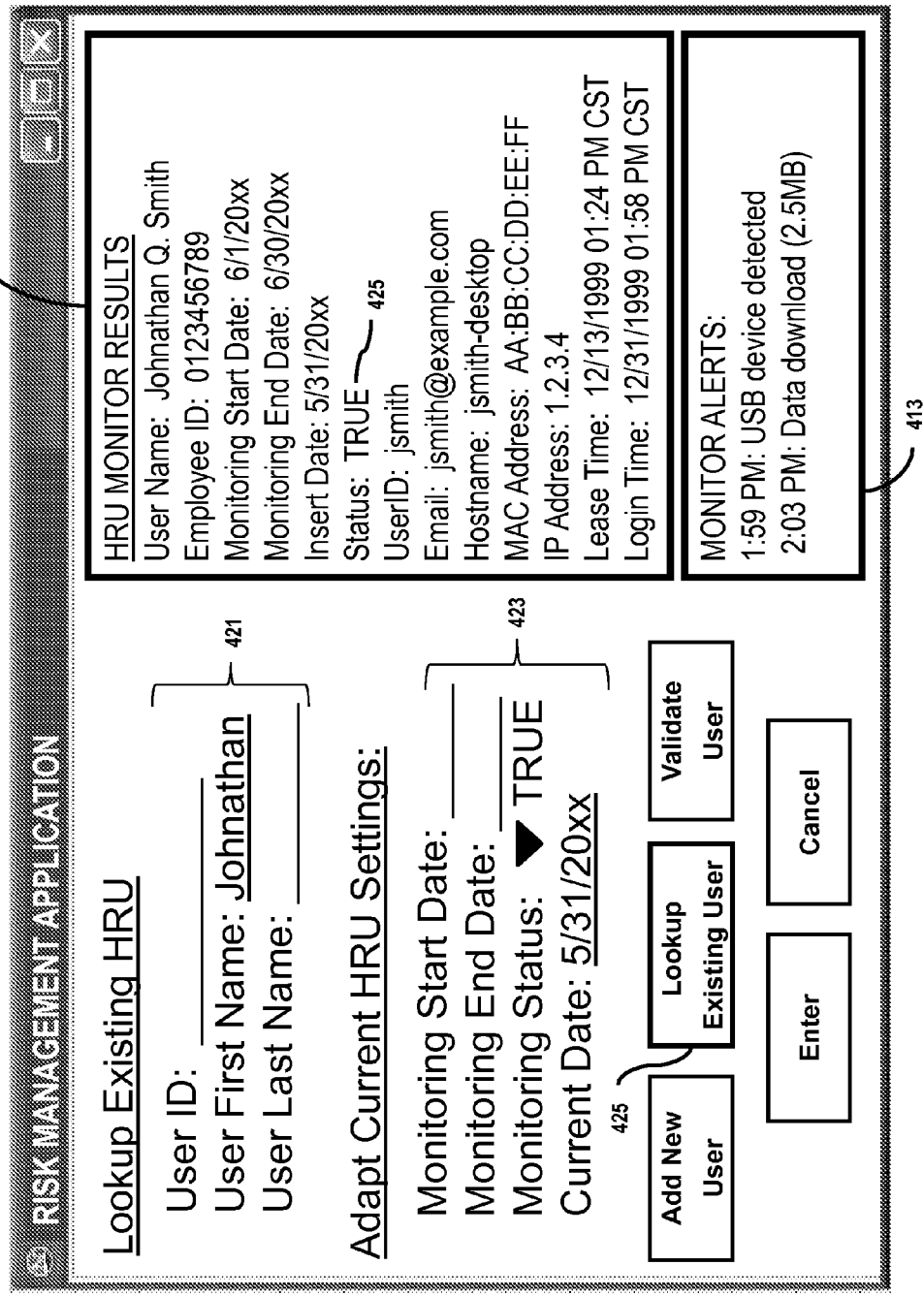

FIGS. 4A and 4B are diagrams of a user interface of a risk management application for managing high risk users, according to various embodiments. The risk management application may be implemented as a front end, web based application for performing various risk management tasks with respect to potential high risk users. As mentioned above, the application is used by the designated monitor, such as a human resource representative or legal team member, to communicate user(s)/candidates that will be placed on the watch list, and potentially escalated to the HRU monitor list. By way of example, the risk management application 107 may present a user interface 400 for enabling a monitor to add new candidates and flag them for addition to the watch list, lookup existing user added to the watch list 217 or HRU monitor list 221, and validate the status of users for monitoring. In addition, the risk management application 107 may also provide risk status notifications and alerts, including an alert viewer 413, to a user (e.g., monitor) for enabling viewing of high risk users and their activities.

The risk management application 400 may feature various data entry fields for enabling the monitor to establish new HRU candidates. By way of example, to activate the process of adding a candidate, the monitor may select an 'Add New User' button 401, for adapting the graphical user interface to suit the new user function of the risk management application 107. The monitor may then provide a user ID, user first name, last name, combination thereof or other identity information 403 for specifying a user of interest to add to the watch list. In addition, the monitor or the risk management application 107 may specify an insert date for indicating a date of entry 405 of the candidate to the watch list. Alternatively, the data sources 115 may be queried dynamically, such as for enabling auto-filling of the various data entry fields 403. It is noted also that the risk management application 400 may present a 'HRU Monitor Results' view 409 for presenting the available asset and identity information pertaining to the user. The asset and identity information may include the parameters as maintained in the watch list 217 or HRU monitor list 221 for the existing user as maintained by the HRU event management platform 111.

By way of example, the risk management application 400 may interact with the data sources 115 to perform extract, transform and load (ETL) processing for receiving asset or identity information dynamically. Asset or identity information as acquired from these sources, which may be maintained as an internal or external resource of the organization, may include user workstation information such as a hostname and media access control (MAC) address, IP address data, email address data, user identifier data and login event data. Such data, which may be specified within the HRU monitor list, may also be presented via the HRU Monitor Results' view 405. As mentioned, there must be at least one unique field to associate with the user such as an Employee ID in order to place them on the watch list 217 or to maintain them on the HRU monitor list 221. Lack of the necessary identity or asset information pertaining to the candidate may prevent them from being monitored appropriately.

Hence, the risk management application 400 may also feature a "Validate User" button 411 for enabling the monitor to validate that a HRU candidate is able to be monitored. The validation process is a control measure employed by the HRU event management platform 111 (e.g., via the HRU update module 207) to insure adequate information is available for the specified candidate. When information is missing, a notification is provided to the monitor by way of the HRU Monitor Results view 409. By way of example, the graphical user interface presents a message specifying an UNAVAILABLE email address 413. As another example, the HRU Monitor Results view 409 may present the monitor with information for indicating the current or real-time status of the specified candidate. For example, a logout time 419 is shown as not applicable (N/A), which may indicate to a monitor that the entered candidate may still be online.

The risk management application 400 may also present "Establish HRU Settings" fields 415 for enabling a user to enter one or more monitoring start and end dates. The start and end data provide information for enabling the HRU event management platform 111 to determine if a candidate on the HRU monitor list 113 should be enabled or disabled. By way of example, if the current date 405 (e.g., insertion date or date of update) is determined by the HRU event management platform 111 to be set between the start date and end date, then a monitoring status 417 is enabled (e.g., set to TRUE). Alternatively, if the current date 405 (e.g., insertion date or date of update) is set outside the start date and end date, then the monitoring status 417 is disabled (e.g., set to FALSE). It is noted that the monitoring status field 417 presents the HRU status via the interface. An exemplary watch list entry record is shown below (Table 5):

TABLE 5

| User Name | Employee ID | Start Date | End Date | Insert Date | Status |
|---|---|---|---|---|---|
| John Q. Smith | 0123456789 | Jan. 1, 2000 | Jan. 31, 2000 | Dec. 31, 1999 | False |

For the above example, data pertaining to the user is inserted into the watch list along with an insert date and an initial monitoring status. When adding a user for the first time, the initial monitoring status 417 is set to FALSE, as shown. As described early, the status is adapted based on detected activity and/or event information.

Still further, the risk management application 400 may feature various data entry fields 421 for enabling the monitor to lookup existing HRU candidates, as shown in FIG. 4B. By way of example, the monitor may provide a user ID, user first name, last name, combination thereof or other identity information for specifying a user of interest. To activate the lookup process via the HRU event management platform 111, the user may select a 'Lookup Existing User' button 425. It is noted that activation of this button may trigger adaptation of the user interface features for enabling the lookup process. Alternatively, the data sources 115 may be queried dynamically as data entry occurs, i.e., auto-filling of the various data entry fields 403.

The risk management application 400 may also present various data fields 423 for enabling adaptation of current HRU settings, and particularly, the monitoring start data, end date and current date. Also, as before, the 'HRU Monitor Results' view 405 may be featured for presenting related asset and identity information pertaining to the user. For illustration purposes, the user specified in the example (Johnathan Q. Smith) has an active monitoring status 425 currently set to TRUE. If the monitor were to modify the date information such that the current data were outside the monitoring start and end date, as shown, the monitoring status may be adapted by the HRU event management platform 111 during the next processing cycle to FALSE accordingly.

As the monitoring status in this example is set to TRUE, the risk management application may also receive from the HRU event management platform 111 monitor alert information as presented via a monitor alerts view 413. The monitor alerts view 413 may feature specific details regarding the high risk activity currently or having been engaged by the user based on monitored events. By way of example with respect to FIG. 4B, the monitor alerts view 413 shows that after logging in at 1:58 PM, Johnathan Q. Smith proceeded to activate a USB device at 1:59 PM. Shortly thereafter at 2:03 PM, a data download of 2.5 megabytes was detected. It is noted that various alerts features, including alarms, screen prompts, etc. may be enabled for prompting the monitor to take action based on the monitor alert information 413.

The exemplary techniques and systems presented herein enable an organization to effectively determine and monitor potentially risky or unwanted user behavior. The HRU event management platform 111 operates effectively with the HRU management system, be it a proprietary or off-the-shelf tool, to correlate data generated during use of the various assets and/or data sources of the organization with a particular user. By way of example, the platform 111 is configured to receive actionable event and/or activity data from the multiple data sources. This data may then be analyzed with respect to a watch list for enabling matching of detected event and/or activity data with high risk activity. Based on the analysis, a designated monitor (e.g., security staff, human resources analyst) can determine if monitoring of the user is required, or alternatively, can act upon the information to thwart risks.

The above processes and arrangement, according to certain embodiments, advantageously enhances network security and minimizes waste of resources by effectively detecting and identifying high risk users.

The processes described herein for determining high risk users may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
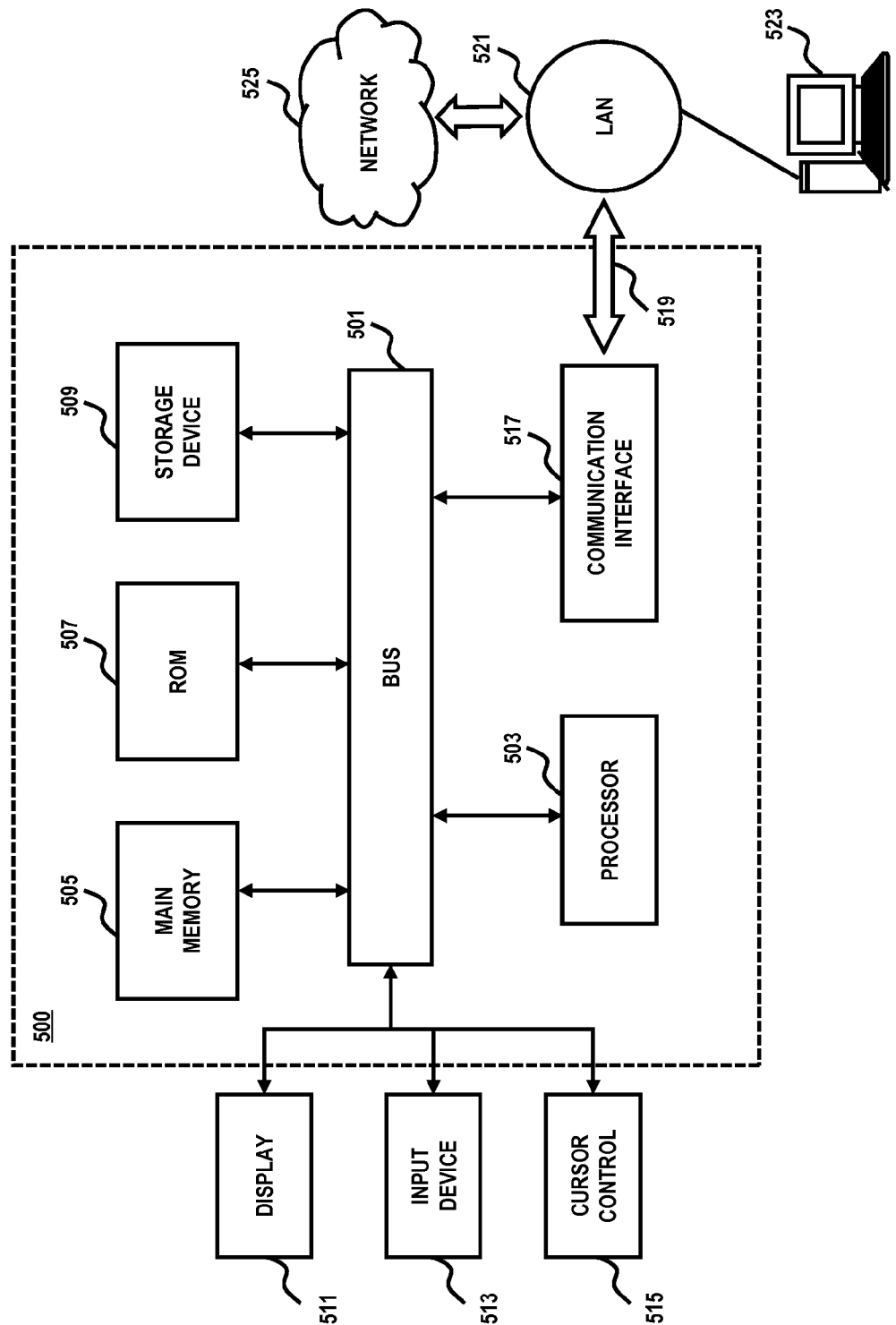
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multiprocessing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 6:
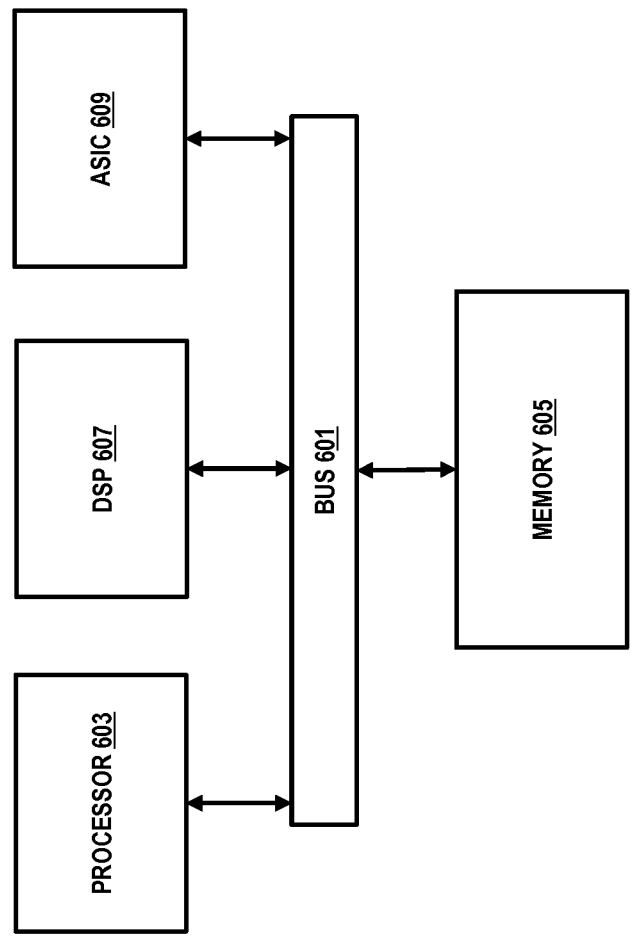
FIG. 6 is a diagram of a chip set that can be used to implement an embodiment of the invention.

FIG. 6 illustrates a chip set or chip 600 upon which an embodiment of the invention may be implemented. Chip set 600 is programmed to enable monitoring of high risk users as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of enabling monitoring of high risk users.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to enable monitoring of high risk users. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
designating, by at least one processor, a user as a high risk user candidate;
placing the high risk user candidate on a watch list of high risk user candidates and designating, in the watch list, a monitoring status of the high risk user candidate as not being monitored;
after said designating the user, initiating monitoring of activities of a computing device associated with identity information of the user and changing, in the watch list, the monitoring status of the high risk user candidate as being monitored;
collecting event data from the computing device and from one or more data sources according to one or more predetermined parameters that specify asset information;
correlating the event data with one or more predetermined high risk events and by the identity information of the user for confirming that the user is a high risk user;
collecting one or more events from the computing device and the one or more data sources;
cross referencing the collected one or more events with specified high risk events or activities to determine whether the collected one or more events is a high risk event or activity;
upon determining the collected one or more events is a high risk event or activity, comparing the collected one or more events with the watch list; and
generating, based on the comparing, a high risk user event to output an alert.

2. A method according to claim 1, further comprising:
retrieving asset information and identity information for the user for determining the high risk user candidacy of the user; and
extracting one or more data pairs relating the asset information or the identity information to a user identifier value.

3. A method according to claim 2, further comprising:
exporting data that is correlated with the identity information to generate the watch list specifying the user.

4. A method according to claim 1, wherein the computing device is configured to access resources of a network associated with an organization, and the user has an employee-employer relationship with the organization.

5. A method according to claim 1, further comprising:
creating an entry for a high risk user list that specifies one or more high risk user candidates,
wherein the entry includes the identity information and timing information for the monitoring of the activities.

6. A method according to claim 1, further comprising:
determining a host name associated with the computing device, a media access control address associated with the computing device, and a network address associated with the computing device; and
generating a high risk monitor list to indicate that the activities of the computing device are to be monitored, wherein the high risk monitor list includes the identity information, the host name, the media access control address, and the network address; and extracting a subset of the correlated event data based on the high risk monitor list.

7. A method according to claim 6, further comprising:
comparing the extracted subset with events associated with the computing device and the one or more data sources; and
updating a watch list based on the comparison.

8. An apparatus comprising:
at least one processor; and
at least one memory including computer program code for one or more programs,
the at least one memory and the computer program code configured to, with the at least one processor, cause the apparatus to perform at least the following,
designate a user as a high risk user candidate,
place the high risk user candidate on a watch list of high risk user candidates and designating, in the watch list, a monitoring status of the high risk user candidate as not being monitored,
after said designating the user, initiate monitoring of activities of a computing device associated with identity information of the user and change, in the watch list, the monitoring status of the high risk user candidate as being monitored,
collect event data from the computing device and from one or more data sources according to one or more predetermined parameters that specify asset information,
correlate the event data with one or more predetermined high risk events and by the identity information of the user for confirming that the user is a high risk user,
collect one or more events from the computing device and the one or more data sources;
cross reference the collected one or more events with specified high risk events or activities to determine whether the collected one or more events is a high risk event or activity;
upon determining the collected one or more events is a high risk event or activity, compare the collected one or more events with the watch list; and
generate, based on the comparison, a high risk user event to output an alert.

9. An apparatus according to claim 8, wherein the apparatus is further caused to:
retrieve asset information and identity information for the user for determining the high risk user candidacy of the user; and
extract one or more data pairs relating the asset information or the identity information to a user identifier value.

10. An apparatus according to claim 9, wherein the apparatus is further caused to:
export data that is correlated with the identity information to generate the watch list specifying the user.

11. An apparatus according to claim 8, wherein the computing device is configured to access resource of a network associated with an organization, and the user has an employee-employer relationship with the organization.

12. An apparatus according to claim 8, wherein the apparatus is further caused to:
create an entry for a high risk user list that specifies one or more high risk user candidates,
wherein the entry includes the identity information and timing information for the monitoring of the activities.

13. An apparatus according to claim 8, wherein the apparatus is further caused to:
determine a host name associated with the computing device, a media access control address associated with the computing device, and a network address associated with the computing device; and
generate a high risk monitor list to indicate that the activities of the computing device are to be monitored, wherein the high risk monitor list includes the identity information, the host name, the media access control address, and the network address; and
extract a subset of the correlated event data based on the high risk monitor list.

14. An apparatus according to claim 13, wherein the apparatus is further caused to:
compare the extracted subset with events associated with the computing device and the one or more data sources; and
update a watch list based on the comparison.

15. A system comprising:
a high risk user management platform configured to receive, from a front end application, high risk user data that has been validated for availability for a particular user, wherein the platform is further configured to generate a list of one or more high risk users in response to the received high risk user data, the list indicating candidates for monitoring; and
a database coupled to the platform and configured to store the list and a monitor table that specifies correlated event data for the particular user that has previously been designated as a high risk user,
wherein the list includes a monitoring status of the candidates indicating whether or not each of the candidates is currently being monitored,
wherein the correlated event data is derived from monitored activities of a computing device associated with the particular user and one or more data sources other than the computing device, and
wherein the platform is further configured to extract, by at least one processor, a subset of the correlated event data to update a watch list based on events collected from the computing device and the one or more data sources, and that have been cross referenced with specified high risk activities to determine whether the events collected are high risk activities, and to correlate the subset of the correlated event data with one or more predetermined high risk events to confirm that the user is a high risk user.

16. A system according to claim 15, wherein the front end application is configured to retrieve asset information and identity information for the particular user for determining candidacy of the particular user to be included on the list, and extract one or more data pairs relating the asset information or the identity information to a user identifier value.

17. A system according to claim 15, wherein the platform is further configured to create an entry for the list, wherein the entry includes the identity information and timing information for the monitored activities.

18. A system according to claim 15, wherein the platform is further configured to generate a high risk monitor list to indicate that the activities of the computing device is to be monitored, wherein the high risk monitor list includes the identity information, host name, media access control address, and network address.

* * * * *